(12) United States Patent
Kokinelis

(10) Patent No.: US 9,908,595 B1
(45) Date of Patent: Mar. 6, 2018

(54) INFLATABLE STANDUP PADDLEBOARD SYSTEM

(71) Applicant: Nicholas A. Kokinelis, Dunedin, FL (US)

(72) Inventor: Nicholas A. Kokinelis, Dunedin, FL (US)

(*) Notice: Subject to any disclaimer, the term of this patent is extended or adjusted under 35 U.S.C. 154(b) by 0 days.

(21) Appl. No.: 15/279,622

(22) Filed: Sep. 29, 2016

Related U.S. Application Data

(60) Provisional application No. 62/242,818, filed on Oct. 16, 2015.

(51) Int. Cl.
*B63B 35/79* (2006.01)
*F16K 15/20* (2006.01)
*F16K 11/00* (2006.01)

(52) U.S. Cl.
CPC .......... *B63B 35/7913* (2013.01); *B63B 35/79* (2013.01); *F16K 11/00* (2013.01); *F16K 15/20* (2013.01)

(58) Field of Classification Search
CPC . B63B 35/79; B63B 35/7913; B63B 35/7909; B63B 3/38; F16K 31/52; F16K 31/528
USPC ............................................. 441/65, 66, 74
See application file for complete search history.

(56) References Cited

U.S. PATENT DOCUMENTS

| | | | | |
|---|---|---|---|---|
| 5,435,339 A | * | 7/1995 | Hayes | F16K 31/528 137/315.04 |
| 8,834,220 B2 | * | 9/2014 | Haller | B63B 35/79 441/74 |
| 2009/0004936 A1 | * | 1/2009 | Mollis | B63B 35/7913 441/66 |
| 2013/0137319 A1 | * | 5/2013 | Haller | B63B 35/7913 441/66 |
| 2014/0242860 A1 | * | 8/2014 | Hoge, Jr. | B63B 35/7913 441/66 |

* cited by examiner

*Primary Examiner* — Lars A Olson

(57) ABSTRACT

A standup paddleboard is fabricated of a flexible air-impervious material. The standup paddleboard is adapted to be filled with air to create an inflated operative orientation for use and is adapted to be depleted of air to create an uninflated inoperative orientation for transported and storage. A forward end and a rearward end are separated by a length. A left side and a right side are separated by a width. An upper face and a lower face are separated by a thickness. A valve stem is attached to the upper face for inflating and deflating the standup paddleboard.

5 Claims, 4 Drawing Sheets

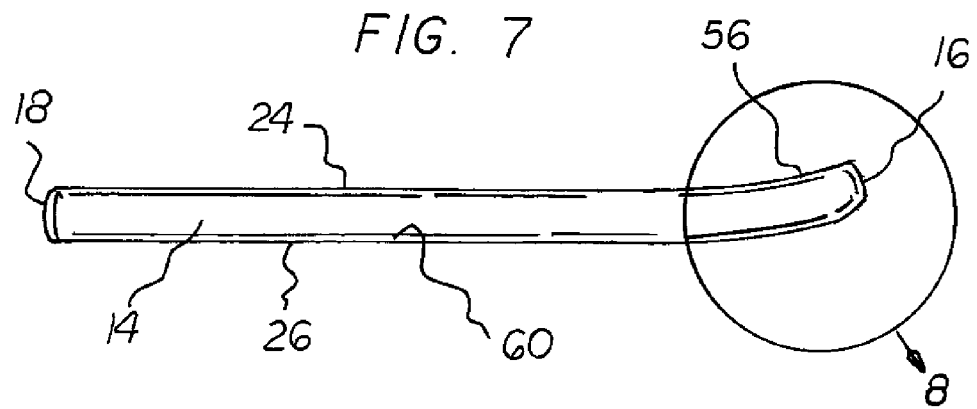
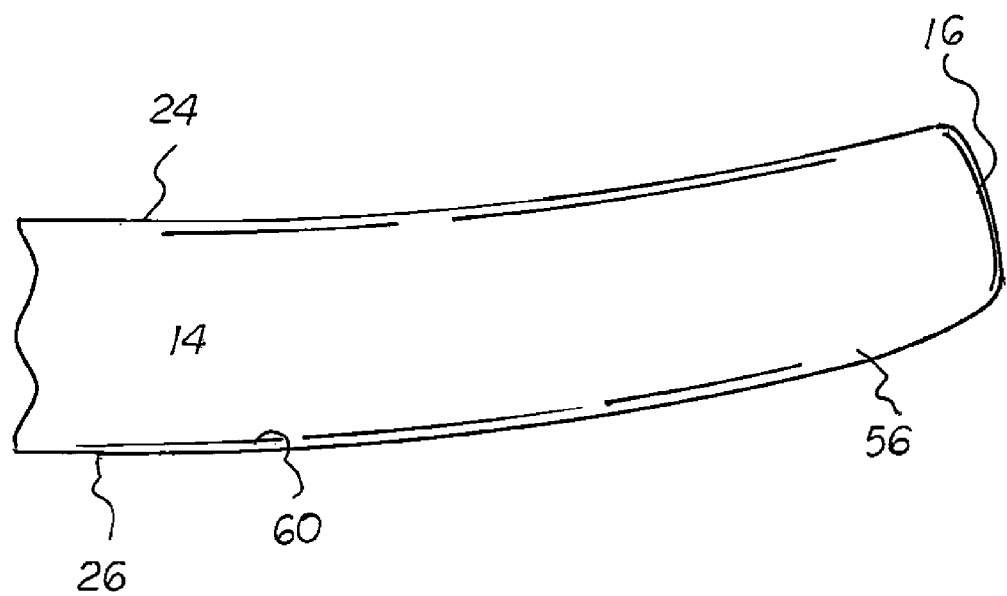

INFLATABLE STANDUP PADDLEBOARD SYSTEM

RELATED APPLICATION

The present application is based upon and claims priority of Provisional Application 62/242,818 filed Oct. 16, 2015, the subject matter of which is incorporated herein by reference.

BACKGROUND OF THE INVENTION

Field of the Invention

The present invention relates to an inflatable standup paddleboard system and more particularly pertains to promoting aquatic exercise and fun and for facilitating assembly and disassembly, the promoting aquatic exercise and fun and the facilitating assembly and disassembly being done in a safe, convenient, and economical manner.

Description of the Prior Art

The use of paddleboards of known designs and configurations is known in the prior art. More specifically, paddleboards of known designs and configurations previously devised and utilized for the purpose of exercise and fun are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, these devices do not describe an inflatable standup paddleboard system that allows for promoting aquatic exercise and fun and for facilitating assembly and disassembly, the promoting aquatic exercise and fun and the facilitating assembly and disassembly being done in a safe, convenient, and economical manner.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Therefore, it can be appreciated that there exists a continuing need for a new and improved inflatable standup paddleboard system which can be used for promoting aquatic exercise and fun and for facilitating assembly and disassembly, the promoting aquatic exercise and fun and the facilitating assembly and disassembly being done in a safe, convenient, and economical manner. In this regard, the present invention substantially fulfills this need.

SUMMARY OF THE INVENTION

In view of the disadvantages inherent in the known types of paddleboard systems of known designs and configurations now present in the prior art, the present invention provides an improved inflatable standup paddleboard system. As such, the general purpose of the present invention, which will be described subsequently in greater detail, is to promoting aquatic exercise and fun and for facilitating assembly and disassembly, the promoting aquatic exercise and fun and the facilitating assembly and disassembly being done in a safe, convenient, and economical manner.

To attain this, from a broad viewpoint, the present invention is a standup paddleboard fabricated of a flexible air-impervious material. The standup paddleboard is adapted to be filled with air to create an inflated operative orientation for use. The standup paddleboard is adapted to be depleted of air to create an uninflated inoperative orientation for transported and storage. The standup paddleboard has a forward end and a rearward end separated by a length. The standup paddleboard has a left side and a right side separated by a width. The standup paddleboard has an upper face and a lower face separated by a thickness. A valve stem is attached to the upper face for inflating and deflating the standup paddleboard.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved inflatable standup paddleboard system which has all of the advantages of the prior art paddleboards of known designs and configurations and none of the disadvantages.

It is another object of the present invention to provide a new and improved inflatable standup paddleboard system which may be easily and efficiently manufactured and marketed.

It is a further object of the present invention to provide a new and improved inflatable standup paddleboard system which is of durable and reliable constructions.

An even further object of the present invention is to provide a new and improved inflatable standup paddleboard system which is susceptible of a low cost of manufacture with regard to both materials and labor, and which accordingly is then susceptible of low prices of sale to the consuming public, thereby making such inflatable standup paddleboard system economically available to the buying public.

Lastly, it is another object of the present invention to provide a inflatable standup paddleboard system for promoting aquatic exercise and fun and for facilitating assembly and disassembly, the promoting aquatic exercise and fun and the facilitating assembly and disassembly being done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a side elevational view of the system similar to FIG. 2 but more clearly illustrating the system profile.

FIG. 8 is an enlarged illustration of the forward portion of the system taken at circle 8 of FIG. 7.

The same reference numerals refer to the same parts throughout the various Figures.

DESCRIPTION OF THE PREFERRED EMBODIMENT

Figure 1:
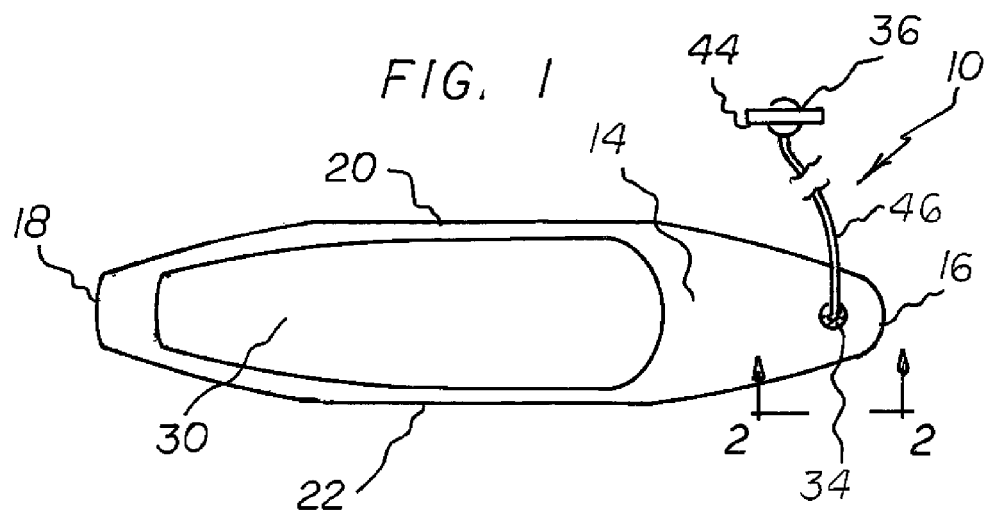
FIG. 1 is a plan view of an inflatable standup paddleboard system constructed in accordance with the principles of the present invention.
Figure 2:
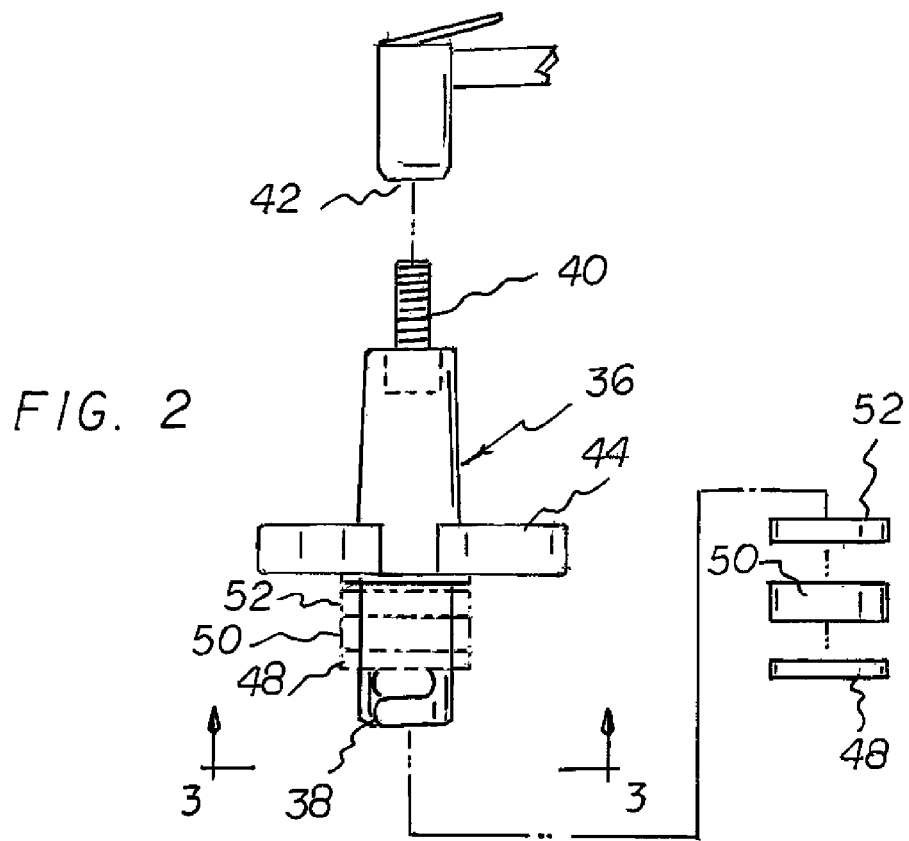
FIG. 2 is a side elevational view of a portion of the system taken along line 2-2 of FIG. 1.
Figure 3:
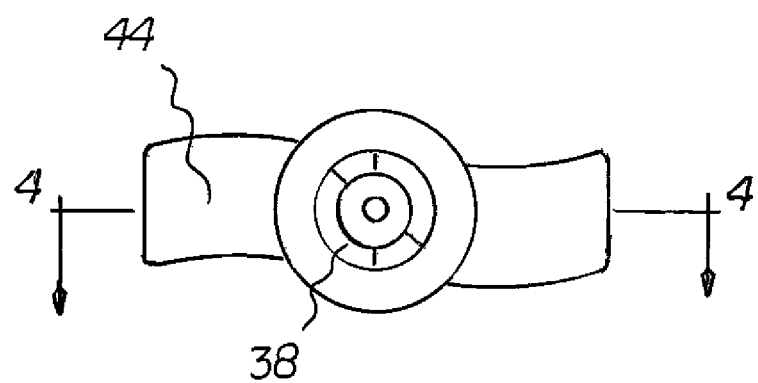
FIG. 3 is a bottom view of a portion of the system taken along line 3-3 of FIG. 2.
Figure 4:
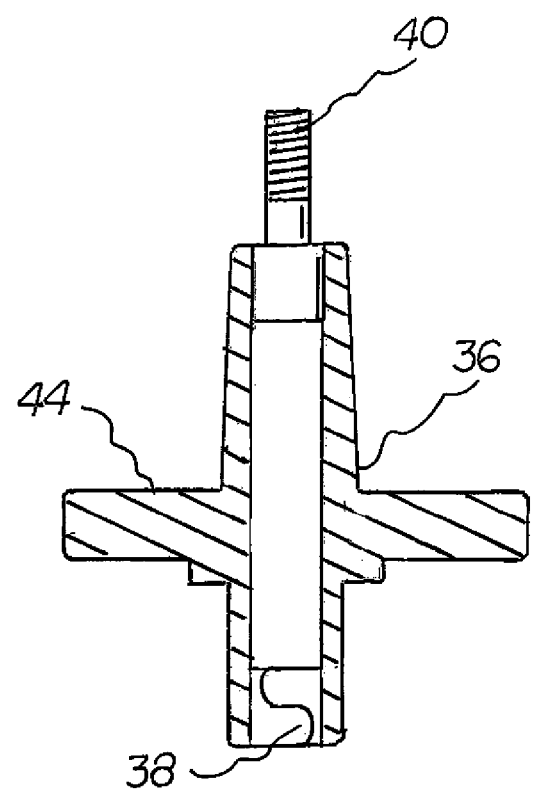
FIG. 4 is a cross sectional view of a portion of the system taken along line 4-4 of FIG. 3.
Figure 5:
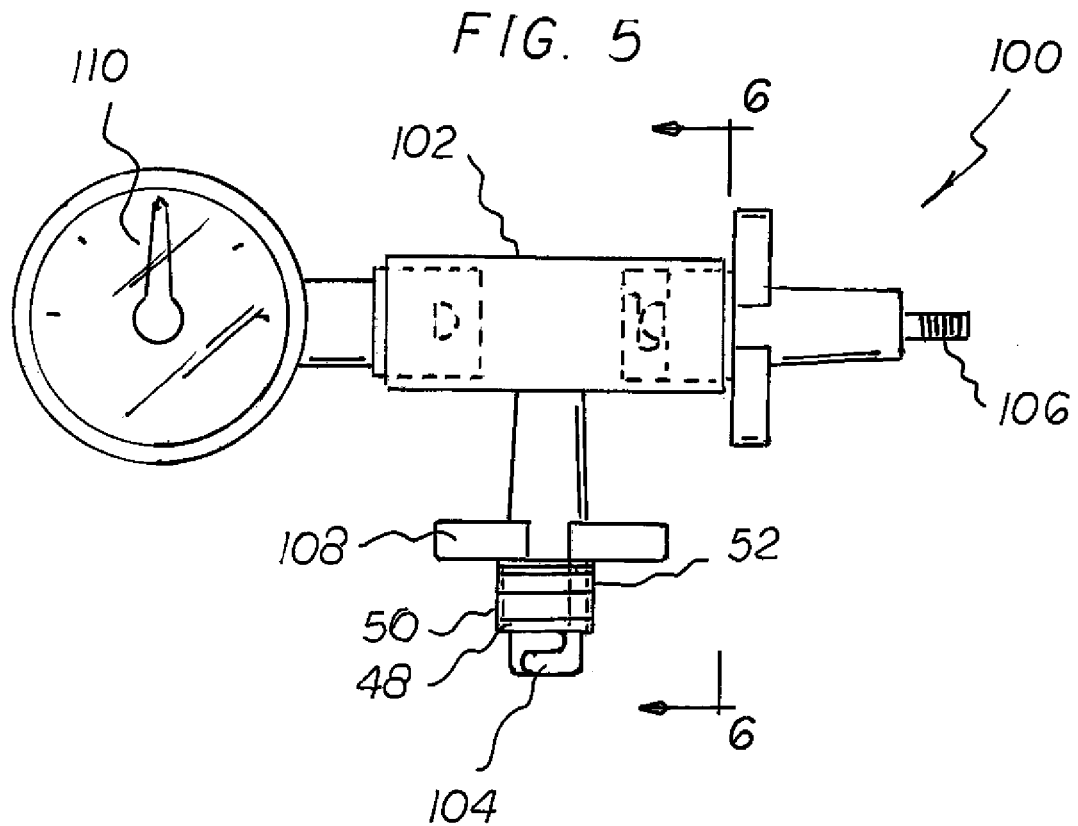
FIG. 5 is a side elevational view of a portion of the system similar to FIG. 2 but illustrating an alternate embodiment of the invention.
Figure 6:
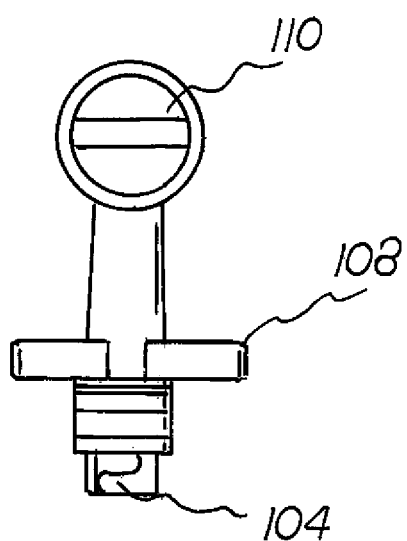
FIG. 6 is a cross sectional view of a portion of the system taken along line 6-6 of FIG. 5.

With reference now to the drawings, and in particular to FIG. 1 thereof, the preferred embodiment of the inflatable standup paddleboard system embodying the principles and concepts of the present invention and generally designated by the reference numeral 10 will be described.

The present invention, the inflatable standup paddleboard system 10 is comprised of a plurality of components. In their broadest context such include a standup paddleboard and a valve stem. Such components are individually configured and correlated with respect to each other so as to attain the desired objective.

From a specific viewpoint, the present invention is an inflatable standup paddleboard system. In the preferred embodiment, first provided is a standup paddleboard 14 fabricated of a flexible air-impervious material. The standup paddleboard is adapted to be filled with air to create an inflated operative orientation for use. The standup paddleboard is adapted to be depleted of air to create an uninflated inoperative orientation for transportation and storage. The standup paddleboard has a forward end 16 and a rearward end 18 separated by a length of from 10 feet 6 inches to 11 feet 8 inches. The standup paddleboard has a left side 20 and a right side 22 separated by a width of 34 inches plus or minus 10 percent. The standup paddleboard has an upper face 24 and a lower face 26 separated by a thickness of 6 inches plus or minus 10 percent.

A soft ethylene vinyl acetate deck pad 30 is provided. The deck pad is located on a central extent of the upper face. In this manner the slipping of a user on the standup paddleboard during use is abated.

A valve stem 34 is provided. The valve stem is attached to the upper face between the deck pad and the forward end. The valve stem is adapted to facilitate the inflating and deflating of the standup paddleboard.

A valve 36 is provided. The valve has a lower end and an upper end. The lower end has 90-degree locking threads 38. The locking threads are adapted to separably couple to the valve stem. A source 42 of compressed air is provided. The upper end of the valve has an inlet 40 for receiving compressed air from the source of compressed air. The valve has a handle 44. The handle is located between the locking threads and the inlet.

Provided next is a flexible extension tube 46. The flexible extension tube couples the valve and the valve stem. In this manner inflating and deflating the standup paddleboard from a remote location is facilitated.

Also provided is a plurality of adaptor rings 48, 50, 52. The adaptor rings are selectively positionable between the locking threads and the handle. The adaptor rings are adapted to create a secure fitting of the valve to the valve stem.

Further provided is an upward curve 56 in the standup paddleboard. The upward curve extends continuously from the forward end and extends rearwardly for between 20 percent and 30 percent of the length of the standup paddleboard.

Provided last is a fin 60. The fin projects downwardly from the bottom face of the standup paddleboard. The fin is located midway between the left side and the right side. The fin has a fin length greater than 50 percent of the length of the standup paddleboard.

In an alternate embodiment of the present invention, the valve 100 is a three-way valve 102. The valve has a lower end. The lower end has locking threads 104. The locking threads are adapted to separably couple to the valve stem. The valve has an upper end. The upper end has an inlet 106 for receiving compressed air from a source of compressed air. The valve has a handle 108. The handle is located between the locking threads and the inlet. The three-way valve also includes a gauge 110. The gauge displays the pressure of air within the standup paddleboard. The gauge and the inlet are coaxial perpendicular to the locking threads and the handle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An inflatable standup paddle board system comprising:
a standup paddleboard fabricated of a flexible air-impervious material, the standup paddleboard adapted to be filled with air to create an inflated operative orientation for use, the standup paddleboard adapted to be depleted of air to create an uninflated inoperative orientation for transportation and storage, the standup paddleboard having a forward end and a rearward end separated by a length, the standup paddleboard having a left side and a right side separated by a width, the standup paddleboard having an upper face and a lower face separated by a thickness;
a valve stem attached to the upper face for inflating and deflating of the standup paddleboard;
a valve having a lower end with locking threads adapted to separably couple to the valve stem, the valve having an upper end with an inlet for receiving compressed air from a source of compressed air, the valve having a handle located between the locking threads and the inlet; and
a plurality of adaptor rings selectively positionable between the locking thread and the handle, the adaptor rings adapted to create a secure fitting of the valve to the valve stem.

2. The system as set forth in claim 1 and further including:
an upward curve in the standup paddleboard, the upward curve extending continuously from the forward end and extending rearwardly therefrom.

3. An inflatable standup paddle board system comprising:
a standup paddleboard fabricated of a flexible air-impervious material, the standup paddleboard adapted to be filled with air to create an inflated operative orientation for use, the standup paddleboard adapted to be depleted of air to create an uninflated inoperative orientation for transportation and storage, the standup paddleboard having a forward end and a rearward end separated by a length, the standup paddleboard having a left side and a right side separated by a width, the standup paddleboard having an upper face and a lower face separated by a thickness;
a valve stem attached to the upper face for inflating and deflating of the standup paddleboard;
a valve having a lower end with locking threads adapted to separably couple to the valve stem, the valve having an upper end with an inlet for receiving compressed air from a source of compressed air, the valve having a handle located between the locking threads and the inlet; and
a fin projecting downwardly from and integrally formed with the bottom face of the standup paddleboard, the fin being located midway between the left side and the right side, the fin having a fin length greater than 50 percent of the length of the standup paddleboard.

4. An inflatable standup paddle board system comprising:
a standup paddleboard fabricated of a flexible air-impervious material, the standup paddleboard adapted to be filled with air to create an inflated operative orientation for use, the standup paddleboard adapted to be depleted of air to create an uninflated inoperative orientation for transportation and storage, the standup paddleboard having a forward end and a rearward end separated by a length, the standup paddleboard having a left side and a right side separated by a width, the standup paddleboard having an upper face and a lower face separated by a thickness;
a valve stem attached to the upper face for inflating and deflating of the standup paddleboard; and
a three-way valve (102) valve having a lower end with locking threads (104) adapted to separably couple to the valve stem, the valve having an upper end with an inlet (106) for receiving compressed air from a source of compressed air, the valve having a handle (108) located between the locking threads and the inlet, the three-way valve also including a gauge (110) for displaying the pressure of air within the standup paddleboard, the gauge and the inlet being coaxial perpendicular to the locking threads and the handle.

5. An inflatable standup paddle board system (10) for promoting aquatic exercise and fun and for facilitating assembly and disassembly, the system comprising, in combination:
a standup paddleboard (14) fabricated of a flexible air-impervious material, the standup paddleboard adapted to be filled with air to create an inflated operative orientation for use, the standup paddleboard adapted to be depleted of air to create an uninflated inoperative orientation for transportation and storage, the standup paddleboard having a forward end (16) and a rearward end (18) separated by length of from 10 feet 6 inches to 11 feet 8 inches, the standup paddleboard having a left side (20) and a right side (22) separated by width of 34 inches plus or minus 10 percent, the standup paddleboard having an upper face (24) and a lower face (26) separated by a thickness of 6 inches plus or minus 10 percent;
an ethylene vinyl acetate deck pad (30) located on a central extent of the upper face to abate slipping of a user on the standup paddleboard during use;
a valve stem (34) attached to the upper deck between the deck pad and the forward end adapted to facilitate the inflating and deflating of the standup paddleboard;
a valve (36) having a lower end with 90 degree locking threads (38) adapted to separably couple to the valve stem, the valve having an upper end with an inlet (40) for receiving compressed air from a source (42) of compressed air, the valve having a handle (44) located between the locking threads and the inlet;
a flexible extension tube (46) for coupling the valve and the valve stem to facilitate inflating and inflating the standup paddleboard from a remote location;
a plurality of adaptor rings (48)(50)(52) selectively positionable between the locking thread and the handle, the adaptor rings adapted to create a secure fitting of the valve to the valve stem;
an upward curve (56) in the standup paddleboard, the upward curve extending continuously from the forward end and extending rearwardly for between 20 percent and 30 percent of the length of the standup paddleboard; and
a fin (60) projecting downwardly from the bottom face of the standup paddleboard, the fin being located midway between the left side and the right side, the fin having a fin length greater than 50 percent of the length of the standup paddleboard.

\* \* \* \* \*